United States Patent
Yufik et al.

(10) Patent No.: US 11,179,846 B2
(45) Date of Patent: Nov. 23, 2021

(54) METHOD AND SYSTEMS FOR ENHANCING COLLABORATION BETWEEN ROBOTS AND HUMAN OPERATORS

(71) Applicants: Yan Yufik, Potomac, MD (US); Tomas Yufik, Potomac, MD (US)

(72) Inventors: Yan Yufik, Potomac, MD (US); Tomas Yufik, Potomac, MD (US)

(*) Notice: Subject to any disclaimer, the term of this patent is extended or adjusted under 35 U.S.C. 154(b) by 232 days.

(21) Appl. No.: 16/519,681

(22) Filed: Jul. 23, 2019

(65) Prior Publication Data

US 2020/0398422 A1 Dec. 24, 2020

Related U.S. Application Data

(60) Provisional application No. 62/702,759, filed on Jul. 24, 2018, provisional application No. 62/789,342, filed on Jan. 7, 2019.

(51) Int. Cl.
*B25J 9/16* (2006.01)
*B25J 13/08* (2006.01)
*B25J 9/10* (2006.01)
*B25J 9/08* (2006.01)

(52) U.S. Cl.
CPC .......... *B25J 9/163* (2013.01); *B25J 9/08* (2013.01); *B25J 9/10* (2013.01); *B25J 9/161* (2013.01); *B25J 9/1653* (2013.01); *B25J 9/1671* (2013.01); *B25J 13/087* (2013.01); *B25J 13/088* (2013.01); *B25J 9/1697* (2013.01)

(58) Field of Classification Search
CPC ............... B25J 9/16; B25J 9/10; B25J 13/08
See application file for complete search history.

(56) References Cited

U.S. PATENT DOCUMENTS

| | | | |
|---|---|---|---|
| 10,898,999 B1* | 1/2021 | Cohen | B25J 9/0003 |
| 2013/0218340 A1* | 8/2013 | Hager | B25J 9/1689 |
| | | | 700/257 |
| 2014/0249676 A1* | 9/2014 | Florencio | G06N 3/008 |
| | | | 700/259 |
| 2015/0331415 A1* | 11/2015 | Feniello | G05B 19/425 |
| | | | 700/257 |
| 2018/0107174 A1* | 4/2018 | Takahashi | G05B 9/02 |
| 2018/0308005 A1* | 10/2018 | Banipal | G06N 3/08 |
| 2018/0322254 A1* | 11/2018 | Smurro | H04N 21/23605 |
| 2019/0156202 A1* | 5/2019 | Falk | G06N 3/0454 |

* cited by examiner

*Primary Examiner* — Kira Nguyen
(74) *Attorney, Agent, or Firm* — W&C IP

(57) ABSTRACT

Methods and systems for enhancing robot's ability to collaborate with human operators by constructing models of objects and processes which are manipulatable by a robot (situation models) and sharing such models with operators. Sharing situation models allows robot to explain its actions to operators in the format they can readily understand. Reciprocally, operators can formulate their instructions to the robot in the format that is both easy to produce for the human and straightforward to interpret in the machine. In this way, the disclosed method and system for constructing situation models in the robot facilitate both adaptation of human operators to robots and adaptation of robots to human operators, thus enhancing collaboration between them.

11 Claims, 3 Drawing Sheets

METHOD AND SYSTEMS FOR ENHANCING COLLABORATION BETWEEN ROBOTS AND HUMAN OPERATORS

CROSS-REFERENCE TO RELATED APPLICATIONS

This application claims priority to U.S. Ser. No. 62/702,759 filed Jul. 24, 2018, and U.S. Ser. No. 62/789,342 filed Jan. 7, 2019. The complete contents of both applications are herein incorporated by reference.

FIELD OF THE INVENTION

This invention pertains to a method for enhancing robot's ability to collaborate with human operators, by constructing models of objects, behavior and inter-object relations manipulated by the robot (situation models) and sharing such models with the operators. facilitating comparison between robot-constructed models and mental models underlying operator's understanding of the situation.

BACKGROUND

It is widely recognized that technology is "entering a new age of AI applications. Machine learning is the core technology. Machine learning models are opaque, non-intuitive, and difficult for people to understand. The current generation of AI systems offer tremendous benefits, but their effectiveness will be limited by the machine's inability to explain its decisions and actions to users" [1].

DESCRIPTION OF RELATED ART

Robot is a multi-purpose machine capable of carrying out various operations depending on the operator-specified goals. Robot's control system seeks to optimize goal-satisfaction activities with respect to robot's technical parameters, including parameters of the sensors and actuators, and conditions in the environment. The optimal control problem is usually expressed in the form of differential equations representing robot's dynamics and performance constraints imposed by the robot's technical parameters and conditions in the environment. Developments in robotics have been focused on improving optimization algorithms and robot's technical parameters, expanding the range and complexity of tasks amenable to robotic execution However, conventional robotics has not been concerned with robot's ability to explain its activities [2]. The problem of explanation became urgent only recently, motivated in part by breakthrough accomplishments in hardware engineering and computational methods radically expanding the range of tasks that can be potentially delegated to robots. Taking full advantage of these potentials requires a degree of trust on the part of human operators, which is predicated on the robot's ability to explain its actions in a format that is not only comprehensible to operators but is aligned with their way of thinking about the task at hand. In short, in order for operators to trust robots and collaborate with them in difficult situations, robots must generate explanations demonstrating what operators would accept as a satisfactory degree of situational understanding. This invention specifies method and system for generating such explanations.

SUMMARY

Aspects of the invention contribute to the solution of an urgent practical demand: development of explainable Artificial Intelligence. "Explainable AI will be essential if users are to understand, appropriately trust, and effectively manage this incoming generation of artificially intelligent partners" [1]. AI systems fall into three classes: opaque systems that offer no insight into its algorithms; interpretable systems where users can mathematically analyze the algorithms; and comprehensible systems that emit symbols enabling user-driven explanations of how a conclusion is reached [3]. This invention defines a comprehensible AI system.

DESCRIPTION

Figure 1:
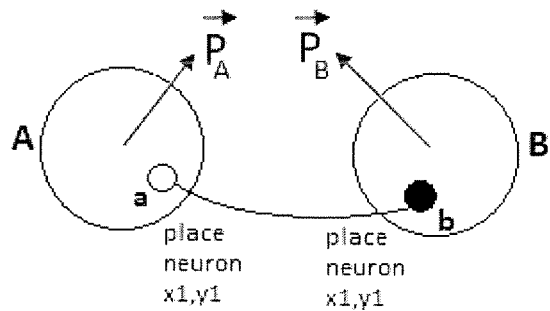
FIG. 1 is a schematic drawing showing an example of neurons, packets, and packet vectors as they can be employed in the practice of the invention.

A fundamental tenant of the invention is to provide robots with the ability to understand situations (using sensors, and trained computer or processing systems (which may be one or many computers linked together in the robot or linked together wirelessly such as by the internet or by wired connectivity), to be able to act or not act based on the understood situations using actuators connected to or which are able to communicate with or receive instructions from the robots, and to be able to explain those actions to a human. Sharing situation models allows robots to explain its actions to operators in the format they can readily understand. Reciprocally, operators can formulate their instructions to the robot in the format that is both easy to produce for the human and straightforward to interpret in the machine. In this way, the disclosed method and system for constructing situation models in the robot facilitate both adaptation of human operators to robots and adaptation of robots to human operators, thus enhancing collaboration between them.

This invention discloses a method and system (called "gnostron" by the inventors) for the design of robotic control systems enhancing robot's ability to collaborate with human operators, by constructing models of objects, their behavior and inter-object relations amenable to manipulations by the robot (situation models) and sharing such models with the operators.

In robots comprised of sensors, actuators and computer-implemented control systems, conventional control systems impose two critical limitations on the robot's abilities: the ability to act autonomously is limited to situations envisioned by the programmers, and the ability to explain robot's own actions is limited to revealing programs causing those actions. Such explanations might suffice for programmers but are meaningless to operators.

This invention defines changes in the robot's control system serving to overcome these limitations in two ways.

First, constructing situation models allows a robot to carry out operator-defined tasks in novel situations not envisioned in the programs, by constructing new models and/or adjusting the previously formed ones. Second, constructing models allows explanations readily comprehended by operators, as follows.

Operators make sense of situations by constructing mental models, and make decisions by applying these models to mentally simulate objects and processes and to plan future actions based on the simulation outcomes indicating the likely changes in the objects and processes caused by the actions. Accordingly, explanations of actions and/or decisions by a gnostron robot expressed in the form of situation models and operations on them are inherently meaningful and understandable to human operators, enabling them to compare robot's models to their own mental models and easily derive tasks and goals (desired changes in objects, behavior and relations, requests for information, or corrective instructions for the robot. In turn, human instructions addressing situation models in the robot streamline translating human input into computations carried out by the robot's operating system. The ability to construct situation models in the robot facilitates both adaptation of human operators to robots and adaptation of robots to human operators, thus enhancing collaboration between them.

The invention yields tangible improvements over conventional robotic control systems, as follows. Robotic control systems include optimization algorithms that determine conditions in the environment based on the data streams generated by sensors and compute optimal responses by actuators, that is, maximizing the likelihood of producing changes in the conditions specified by the operators (goals). Conventional robotic control systems can incorporate learning algorithms that make possible training the robot to associate conditions to responses appropriate for particular goals, thus circumventing the need for optimality-seeking response computation. Conventional operating systems can also incorporate models of objects and processes manipulated by the robot, usually in the form of differential equations. The problem is that a) both, the associations and the equations reflect particular goals and conditions and do not transfer easily or at all to other goals and conditions and b) explanations afforded by associations and equations can remain incomprehensible, ambiguous or insufficient to the operators. The ability to construct situation models mitigates these shortcomings of conventional control systems and delivers a dual improvement of a) expanding the range of situations where the robot can act autonomously (without being programmed or trained in advance for such situations) and b) enhancing robot's ability to collaborate with humans in situations both within and outside that range. In such collaboration, robot transmits to operator situation models and decisions derived from them, and receives from the operator queries and instructions for correcting the models and/or decisions.

The disclosed method and system are motivated by theories of brain operation advanced by the inventors and other authors. The invention has broad applicability, based on the following suggestions: a) any and all situations can be defined by the participating objects, the forms of behavior and behavior variations afforded by these objects when acting independently, and patterns of behavior coordination (relations) between the objects resulting from their interaction in the situation, b) brain operates as an optimal controller seeking to optimize motor responses respective the incoming sensory streams, c) in the human brain, response optimization involves constructing and exercising situation models (that is, mental models are optimization heuristics discovered and fine-tuned by the evolution) and d) model construction, as well as other cognitive operations in the human, boils down to different patterns in the orchestration of neuronal activity (firing and inhibiting neurons) and involves formation of cohesive but flexible neuronal groupings (neuronal packets) matched against the sensory stream.

Accordingly, the method of situation modeling in this invention involves orchestrating activities in a pool of artificial neurons. The following seven contentions formulated by the inventors in the earlier publications [3-15] are central to the method (the contents of all prior publications being herein incorporated by reference):

1. In the neuronal pool (as in the brain), objects are represented by quasi-stable neuronal groupings surrounded by boundary energy barriers (neuronal packets).
2. Due to barriers, neuronal packets act as units, which is represented by assigning response vectors to packets summarizing responses of all the neurons inside the packet.
3. The forms of behavior and behavior variations afforded by objects are represented by different trajectories in the rotation of packet vectors.
4. Mutual coordination in the behavior of objects in a situation (inter-object relations) is represented by patterns of coordination in the movement of packet vectors.
5. Interaction between objects in a particular relation establishes mappings between the packets which restricts the range of movements allowed to packet vectors thus reducing the number of degrees of freedom in the packets (e.g., in the interacting objects A and B, place neurons in packet A representing A's position in space inhibit the corresponding place neurons in packet B, preventing B from moving into position occupied by A).
6. Simulating situations involves rotating packet vectors in a coordinated fashion, consistent with the inter-object relations.
7. Simulations produce predictions, as the likely extensions of packet vector trajectories admissible under coordination and interactions in the situation, and retrodictions, as the likely past vector trajectories having the current vector positions as the endpoints.

FIG. 1 schematically illustrates the above contentions. Specifically, for mapping between packets, place neurons "a" and "b" in respective packets "A" and B" respond to the same position x1, y1 in a two-dimensional (2D) space. Excited neuron "a" in packet "A" inhibits neuron "b" in packet "B", thus disallowing movement of B to x1, y1. This limits rotation of packet vector $P_B$ and reduces the number of degrees of freedom in packet "B".

Figure 2:
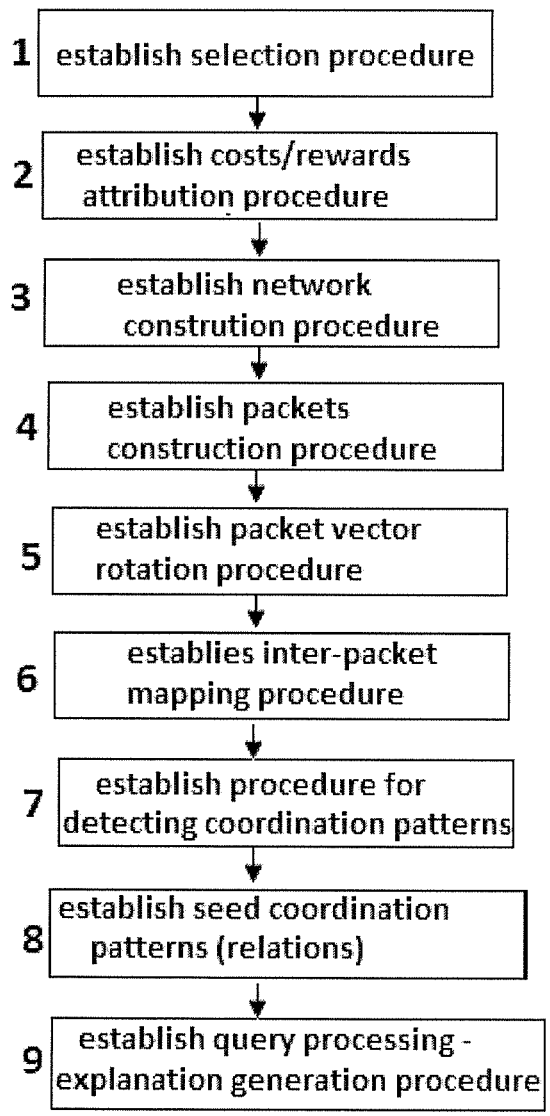
FIG. 2 is an exemplary flow diagram showing exemplary procedures for implementing a gnostron robot.

FIG. 2 illustrates nine exemplary steps for construction of a gnostron robot according to one embodiment of the invention which utilizes the process illustrated in FIG. 1 and implements the explanations (step 9) which are unique feature to this invention.

According to the present invention, a robot provides a comprehensive explanation of its actions to the operator via an interface that accepts operator queries and provides responses in the form of explanations revealing composition of situation models (objects, behavior, relations) and the results of simulations comprising predictions and retrodictions. Such explanations are both comprehensive and comprehensible, providing information in a format readily understood by the operator and delivering content allowing operator to evaluate robot's decisions and formulate collaborative instructions. Such explanations can fit easily into the operator's decision flow, avoiding the need for a cognitively demanding process of examining computations underlying robot's responses and mapping them onto mental models underlying operator's understanding of the situation at hand.

The following examples illustrate types of explanation that can be derived from situation models.

A) In 1987, the USS Stark was on a patrol mission in the Persian Gulf, due to an on-going military conflict between Iran and Iraq. While prosecuting the mission, the USS Stark was struck by two missiles fired from an Iraqi F-1 Mirage fighter. Sensors on the Stark and other U.S. assets registered the following sequence of events:

1. F-1 Mirage fighter is moving away from the Stark and is labeled as "friendly."
2. The fighter executes a sharp turn and increases speed in the general direction of the Stark.
3. The fighter turns directly towards the Stark.
4. Missiles are released.

The subsequent analysis of the incident attributed the outcome to "inaccurate perception, comprehension, and projections" by the crew members.

In contrast, a gnostron robot collaborating with the crew in the control of sensors and weapons on the Stark could initiate defensive maneuvers accompanied by weapons allocation, by forming a model comprising the fighter and the Stark and establishing relations "fighter threatens the Stark" and "fighter attacks the Stark." Relations threatens and attacks correspond to different patterns of coordination in the movement of packet vectors representing behavior of the two objects (e.g., some neurons in a packet represent object's position in space so their successive firing represents movement; other neurons represent different types of signaling emitted by the object, etc.; accordingly, variations in the movement and signaling are represented by variations in the movement of the packet vector; pattern of inter-vector coordination corresponding to "A sharply turns towards B" establishes relation "A threatens B").

Establishing a relation predicts the likely future changes in the objects while interaction between the objects limits the range of admissible changes and, accordingly, the range of admissible vector movements (for example, relation "fighter threatens the Stark" predicts turning directly and accelerating towards the Stark, interaction between the fighter and the Stark determined by their positions in space and other features of the situation limits the range of attack maneuvers and, accordingly, reduces the number of degrees of freedom in the movement of packet vector in the fighter packet). Explanations "fighter threatens the Stark" and "fighter attacks the Stark" demand no further interpretation by crew members and can improve their perception and comprehension of the situation. Responding to query "Why (do you believe that) fighter threatens the Stark?" with "fighter turning sharply and accelerating towards the Stark poses a threat" provides information allowing crew members to evaluate robot's decisions and formulate corrective instructions (e.g., override the decision). Collaboration between the crew and the robot based on the shared situation model streamlines both the process of defining goals, priorities and constraints by the crew, and the process of mapping those inputs onto the modeling procedures in the robot. For example, establishing "own safety" as the first priority biases robot's procedures towards downgrading the significance of the "friendly" identification.

B) The Three Mile Island accident was a partial meltdown of nuclear reactor in the Three Mile Island Generating Station. The catastrophic event began with mechanical failures resulting in large amounts of nuclear coolant escaping the reactor. Mechanical failures were followed and compounded by the failure of plant operators to understand the unfolding situation and recognize it as a loss-of-coolant accident. The breakdown in understanding was subsequently attributed to deficiency in the reactor interface design causing operators to overlook one of the indicators and manually override the automatic emergency cooling system.

A gnostron robot collaborating with the operators in control of sensors and reactor mechanisms in the nuclear power plant could identify the relation between the loss of coolant condition and the state of the reactor as threat and issue explanations advising against the manual override. Gnostron simulation would predict the possibility of a meltdown, accompanied by generating explanations in the form "overriding the emergency cooling system will cause continuing loss of coolant and catastrophic overheating." Predictions derived from packet vector manipulations can be concurrently or subsequently validated and detailed by the gnostron process engaging conventional modeling routines expressing reactor processes in the form of differential equations.

Figure 3:
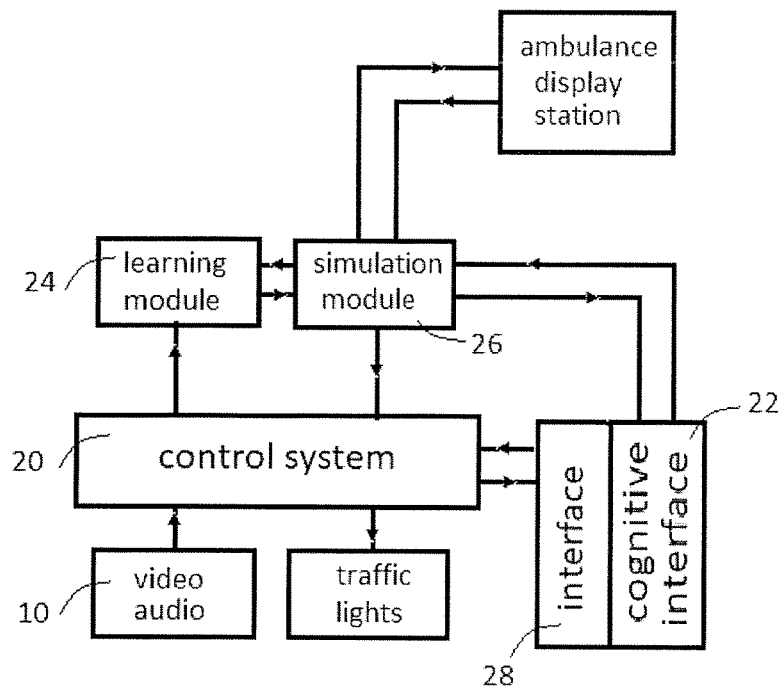
FIG. 3 is a schematic drawing of an exemplary gnostron system used for understanding and explaining sensed actions by an ambulance.

3) A traffic—regulating gnostron robot manipulates sensors (video cameras) and actuators (traffic lights) and collaborates with road service operators in optimizing traffic in some area, responding dynamically to road conditions and priorities across the area. With reference to FIG. 3, having detected an ambulance moving and sounding a siren in some part of the road network and an accident and after-accident activities in progress in some other part, the robot can establish a relation (e.g. of the type "A rescues B" implying positioning of A in the proximity of B) and issue an advisory to the operators suggesting orchestration of the traffic signals in network allowing the shortest time for the ambulance to reach the accident site. Collaboration might extend beyond the road service, e.g. by the robot communicating with the ambulance dispatch station to confirm the destination of the ambulance. A situation model constructed by gnostron accounts for the behavior of the ambulance combining the movement and siren sounding—absence of the sound would not be compatible with a rescue mission thus preventing formation of the ambulance—accidents relation.

In FIG. 3, the gnostron robot includes or receives sensor input in the form of, for example, one or more of video sensors and audio sensors 10. With the control system 20, cognitive interface 22, and based on learning modules 24 and simulation modules 26, the gnostron robot can determine first whether an ambulance is present on the roadway as well as where it is located, and second whether the ambulance is actively performing a rescue. For example, if there are no sirens blaring and no lights flashing, the ambulance may simply be transporting a patient from a clinic to a hospital, but is unlikely to be in the process of a rescue. However, if the sirens and lights are detected, and if the gnostron robot observes the ambulance moving rapidly, and moving past stopped or stopping traffic by performing evasive maneuvers. which the gnostron robot will recognize from prior training, then it is quite likely the ambulance is a rescue operation. When a gnostron robot recognizes that an ambulance is in a rescue operation. it can direct traffic lights (exemplary actuators) to turn green or red. For example, the gnostron robot may activate a green light chain at locations x1, y1 and x2, y2 in front of the traveling path of the ambulance so that the ambulance may pass through traffic along its pathway more quickly. The Gnostron operator could provide an operator. such as a driver of the ambulance, that it is activating green lights on street x to clear its pathway along street x. In a display 30 on the ambulance, the driver could know he or she could drive faster along street x because of the actions being taken by the gnostron robot. However, the driver could also inform the gnostron robot, the ambulance will be turning onto street y before x2, y2, and the gnostron robot would then be able to change the x2, y2 light to red and turn other lights on street y green. In FIG. 3 it can be seen that the gnostron robot is able to comprehend what is happening based on sensed input, take actions to fit the perceived situations, and provide explanatory information to an operator in a form that can be understood, and further, if required, be able to receive corrective information from the operator so that the gnostron robot may take different actions.

As shown by example in FIG. 3, gnostron architecture includes Learning Module, Simulation Module and Cognitive Interface. The Learning Module 24 comprises a pool of artificial neurons and matching procedure that selects neurons in the pool and matches them to elements in the data stream generated by sensors. Selecting and matching (firing) neurons incurs costs, successful matches are rewarded, the matching procedure seeks to maximize rewards while minimizing costs. Co-selected neurons become connected by associative links; recurring co-selections increment the strength (weight) of the connection. The link-weighted neuronal network forming in the pool is partitioned into groupings surrounded by energy barriers (neuronal packets), with the height of the barriers computed as a function of weight distribution inside the packet and in its immediate surrounds. The matching procedure incurs additional costs at the barriers when accessing or exiting packets, which biases it towards trying out different selections inside packets before shifting to other packets. Variations in selection patterns inside packets cause rotation of population vectors computed on the packets (packet vectors). Rewards are maximized and costs minimized in groups of packets imposing some form of coordination on the rotation of packet vectors. Formation of such coordinated groups underlies construction of situation models representing objects (neuronal packets), their behavior (movement of packet vectors), relations (coordination in the movement of packet vectors) and interaction constraints (mapping between packets limiting the range of packet vectors rotation).

The Simulation Module 26 exercises situation models, by causing coordinated rotation of packet vector and generating predictions and retrodictions. Simulation Module is equipped with a metric and a method applying the metric to assess the degree of goal satisfaction yielded by the robot's actions informed by the exercise of the model. Cognitive Interface 22 accepts operator's queries and formulates responses displaying the composition of situation models and results of simulation. Cognitive Interface overlays conventional system interface 28, and can be made transparent to the operator thus allowing access to the underlying parameters and indicators.

Figure 4A:
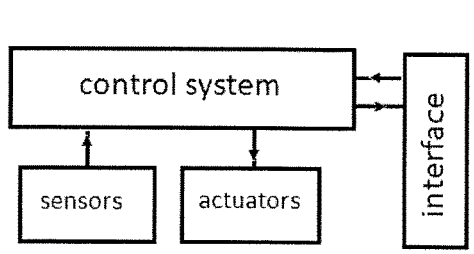
FIGS. 4A and 4B are schematic drawings contrasting conventional control systems (FIG. 4A) with GNOSTRON control system according to the invention (FIG. 4B)
Figure 4B:
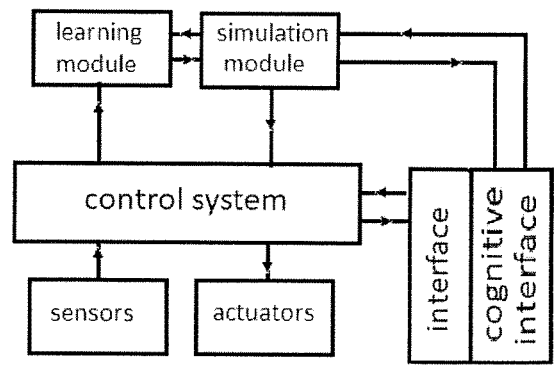

FIG. 4A shows the conventional control system architecture includes sensors, actuators, a control system, and an interface. By contrast, the gnostron system includes a cognitive interface, a learning module and a simulation module as discussed above.

A gnostron system operates in two modes: training and deployment. During training, the system is presented with a variety of programmer-constructed situations sufficient for the construction of neuronal packets and packet vector operations representing the multitude of objects, behavior and types of relations the robot can be expected to encounter.

Also, the system can be directly seeded with a set of vector coordination patterns (relations). During deployment, the system constructs situation models seeking combinations of objects and relations that match situation dynamics under the constraints specific to the situation. In such construction, the system is not limited to precedents encountered in training but can construct new models offering and acceptable level of input stream matching and goal satisfaction. Collaboration with human operators during deployment provides performance feedback to gnostron in the form of corrective instructions, which allows continued improvement of the existing models and construction of new ones.

Figure 5:
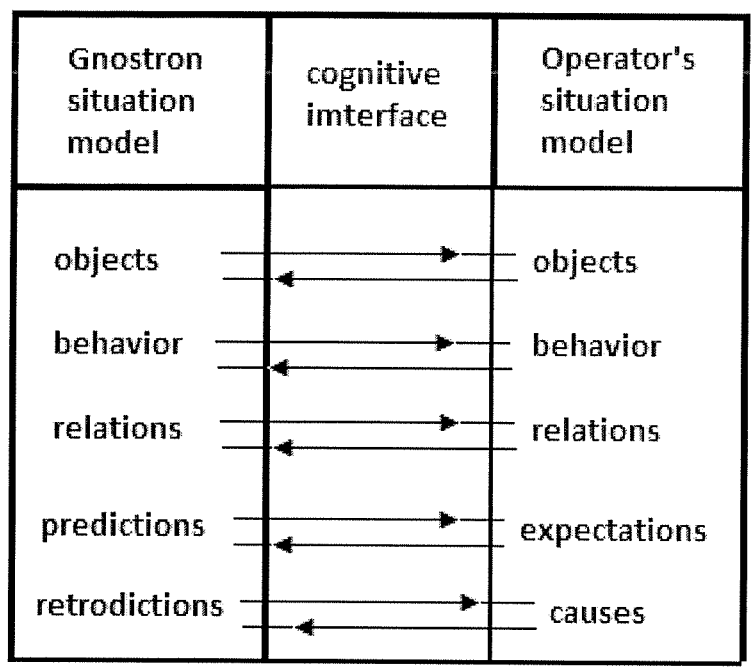
FIG. 5 is a schematic drawing illustrating generation of comprehensible explanations of robot's own decisions and actions, based on establishing mapping between and comparing operator's mental models and situation models constructed by the robot.

The gnostron method and architecture complement AI systems derived from the perceptron method and architecture (neural nets). Perceptron-based systems are opaque and do not support gradual improvement in the course of their deployment. By contrast, gnostron-based systems are inherently comprehensible and amenable to continuing improvement in the course of deployment. Implementing one embodiment of the gnostron method and system by a practitioner skilled in the art involves a succession of steps specified in FIG. 1:

1. Establish selection procedure: define plurality of neurons (neuronal pool) responding probabilistically to data elements; define procedure for selecting neurons and matching them to data elements.
2. Establish costs/rewards attribution procedure: define algorithms for probabilistic reward assignment in successful matches; define costs of selection and matching operations, including the costs of barrier crossing in neuronal packets.
3. Establish network construction procedure: define algorithms for constructing associative network in the pool, by linking neurons repetitively co-selected by the selection and matching procedure and incrementing link weights with every occurrence of co-selection.
4. Establish packets construction procedure: define algorithms for partitioning the link-weighted associative network into internally cohesive and externally weakly coupled neuronal groups, or packets (the summary weight of connections inside a packet exceeds the summary weight of connections extending outside the packet); define procedure for computing height of boundary barriers in the packets, as a function of link weight distribution inside the packet and in the packet's immediate surrounds.
5. Establish packet vector rotation procedure: define algorithm for computing population vectors on neuronal packets and representing selection variations in the packets as rotation of packet vectors.
6. Establish inter-packet mapping procedure: define algorithms for establishing excitatory/inhibitory connections between packets (excitatory connection between neurons a and b in packets A and B, correspondingly, mandates selection of neuron b if neuron a was selected; inhibitory connection between a and b prohibits selecting neuron b if neuron a was selected).
7. Establish procedure for detecting coordination patterns in the movement of packet vectors: define algorithms for detecting recurring correspondences in the composition and order of packet vector rotating events in a group of packets.
8. Establish seed coordination patterns: establish relations data base and define plurality of templates specifying particular correspondences in the composition and order of packet vector rotation events in two packets (i.e., templates for specifying relations between objects, e.g., object A controls object B, object A pulls object B, etc.).
9. Establish query processing and explanation generation procedures: define algorithms to a) support operator in structuring queries addressing the composition and operation of gnostron-constructed situation models and b) optimizing information content and presentation layout when explicating gnostron-constructed situation models and responding to operator's queries. FIG. 5 indicates that human-comprehensible explanations are obtained via direct mapping between the components of operator's mental models and gnostron-constructed situation models.

Operating gnostron system involves the stages of: a) exposing the system to training situations and compiling data base comprising packets (objects), patterns of packet vector movement (behavior), and patterns of movement coordination (inter-object relations) and b) deploying the system and applying operator feedback to continue populating the data base.

The possibility of direct mapping between psychological processes underlying situational understanding in the human and computational processes underlying response optimization in the robot constitutes a unique feature of this invention satisfying the definitive requirement of "comprehensible AI" [3]. It was hypothesized that neuronal processes in the human brain have been optimized by the evolution to allow converting a part of internally generated heat into the work of mental modeling [4]. In the gnostron system, artificial neurons can comprise neuromorphic elements designed in such a way that heat generated in the course of computation is partially converted into the work of constructing and executing situation models, thus minimizing energy consumption and increasing thermodynamic efficiency of the system.

REFERENCES

1. Turek, M., 2017. Explainable Artificial Intelligence (XAI). Available on the internet at darpa.mil/program/explainable-artificial-intelligence
2. Burlich, R., Kraft, D. 1994. Computational optimal control. Birkhauser Basel Switzerland
3. Doran, D., Schulz, S., Besold, T. R 2017. What does Explainable AI Really Mean? A New Conceptualization of Perspectives. arXiv:1710.00794v1 [cs.AI] 2 Oct. 2017
4. Yufik, Y. M. 2019. The understanding capacity and information dynamics in the human brain. Entropy, 21(3), pp. 308-346, doi:103390/e21030308
5. Yufik, Y. M. 2018. Gnostron: a framework for human-like machine understanding. IEEE. Series on Computational Intelligence, SSCI-2018, Bangalore, India, pp. 136-145 Yufik, Y. M.,
6. Yufik, Y. M., Yufik, T. 2018. Situational understanding. Proc. 7$^{th}$ Int. Conf. Adv. Computing, Communications, Inform. Technology, Rome, Italy, pp. 21-27
7. Yufik, Y. M. 2018. Understanding capacity in the human and the machine. Proc. 7$^{th}$ Int. Conf. Adv. Computing, Communications, Inform. Technology, Rome, Italy, pp. 68-71
8. Yufik, Y. M., Friston, K. 2016. Life and understanding: Origins of the understanding capacity in self-organizing nervous systems. Frontiers in Systems Neuroscience.
9. Yufik, Y. M. 2016. US Patent: Method and system for computer understanding of multi modal data streams. U.S. Pat. No. 9,378,455
10. Yufik, Y. M. 2017. US Patent: Method and system for computer understanding of multi modal data streams. U.S. Pat. No. 9,563,843
11. Yufik, Y. M. 2014. Situational awareness, sensemaking, and situation understanding in cyber warfare. In: R. E. Pino et al. (eds.), Cybersecurity Systems for Human Cognition Augmentation, Advances in Information Security 61, 1-18.
12. Yufik, Y. M. 2013. Understanding, consciousness and thermodynamics of cognition. Chaos, Solitons & Fractals 55, pp. 44-59
13. Yufik, Y. M. 2013. Understanding cyber warfare. In: R. E. Pino (ed.) Network Science and Cybersecurity, Advances in Information Security 55, Springer, N.Y. pp. 75-91.
14. Yufik, Y. M. 2013. Towards a theory of understanding and mental modeling. Recent Advances in Computer Science, Elsevier, pp. 250-255.
15. Yufik, Y. M. 2003. Transforming data into actionable knowledge in network-centric warfare. J. Battlefield Technology, 6, 1, 1-10.
16. Yufik, Y. M. 2002. How the Mind Works. Proc. IEEE World Congress on Computational Intelligence, Honolulu, Hi., pp. 2255-2259

The invention claimed is:

1. A system comprising:
a plurality of robots equipped with sensors and actuators; and
at least one control system incorporating a learning module, a simulation module and a cognitive interface;
wherein the cognitive interface is configured to accept goals and constraints specified by one or more human operators;
wherein the goals and constraints represent changes in properties of objects that are accessible to at least one of the plurality of robots through the sensors and the actuators;
wherein the changes in the properties of objects comprise changes in position, motion, temperature, mechanical characteristics, molecular composition, emitting sound, emitting radiation, and emitting substances;
wherein the learning module is configured to process data streams generated by the sensors and construct situation models representing the objects, changes in the properties of the objects over time, and patterns of behavior co-ordination of the objects;
wherein the simulation module is configured to exercise situation models constructed by the learning module to perform a plurality of the following:
a) assess the range of possible actions and probable changes in the objects,
b) evaluate changes in the objects and select actions likely to produce a high degree of goal satisfaction,
c) engage the cognitive interface to transmit information about the models, selected actions and the likely outcomes to an operator,
d) engage the cognitive interface to receive corrective information from the operator,
e) deploy actuators to carry out the corrected actions,
f) deploy sensors to assess the resulting changes in objects and behavior, and
g) make adjustments to the situation models or construct new ones.

2. The system of claim 1, wherein: the learning module is configured as a neuronal pool, with a matching procedure operating on the pool to select neurons and match them to elements in at least one data stream; construction of models by the learning module involves a) representing regularities in at the least one data stream in the form of link-weighted associative networks connecting neurons in the pool that have been repetitively co-selected by the matching procedure, b) representing objects as subnets in the associative networks surrounded by boundary energy barriers, with packet vectors computed on the subnets, c) representing behavior of the objects as rotation of the packet vectors of the objects, d) representing relations between the objects as patterns of co-ordination in the rotation of the packet vectors of the objects and e) constructing models as networks encompassing the objects and pairwise relations.

3. The system of claim 2, wherein: interactions between the objects are represented as inhibitory/excitatory mapping between the packets of the objects in at least one of the models, causing reduction in the number of degrees of freedom in the movement of the packet vectors of the objects.

4. The system of claim 2, wherein: the simulation module constructs a model of at least one robot in the plurality of robots representing Self as an object entering into relations with other objects.

5. The system of claim 4, wherein: situation models incorporate the model of the at least one robot in the plurality of robots representing Self, enabling the at least one robot to anticipate how changes in the objects caused by the at least one robot can produce changes in the at least one robot.

6. The system of claim 2 wherein models are constrained to allow objects and relations participating in goal satisfaction and to disallow objects and relations having no impact on goal satisfaction.

7. The system of claim 2 further comprising analog units configured to implement procedures in the pool to form neuronal packets.

8. The system of claim 2 wherein artificial neurons and operations on them are implemented in architectures including neural networks and recurrent neural networks.

9. The system of claim 1, wherein: a) information about situation models, selected actions and changes expected to be produced by the actions is transmitted to a team of robots within the plurality of robots b) requests for actions and/or action adjustments are received from the team of robots, c) requests from the team of robots are evaluated by the simulation module, d) requested actions and/or action adjustments that do not reduce an initially expected degree of goal satisfaction are adopted by the robot and e) actuators are deployed to carry out the adopted actions.

10. The system of claim 9, wherein: costs are associated with packet vector movements, rewards are associated with obtaining the desired changes in the objects, and the matching procedure seeks to maximize rewards while minimizing cumulative costs.

11. The system of claim 9 wherein simulation and production of predictions include computational procedures implementing Bayesian and other forms of probabilistic updating.

* * * * *